United States Patent

[11] 3,533,376

[72] Inventor Henry A. Smith
 399 Western Drive, Richmond, California
 94801
[21] Appl. No. 722,273
[22] Filed April 18, 1968
[45] Patented Oct. 13, 1970

[54] HUNTING BLIND FOR DOGS
 2 Claims, 4 Drawing Figs.
[52] U.S. Cl. .................................................... 119/1
[51] Int. Cl. .............................................. A01k 01/00
[50] Field of Search .......................................... 119/1, 15,
 19; 43/1

[56] References Cited
 UNITED STATES PATENTS
| | | | |
|---|---|---|---|
| 2,971,493 | 2/1961 | Robb .......................... | 119/1 |
| 3,026,844 | 3/1962 | Spindler ...................... | 119/19 |
| 3,308,789 | 3/1967 | Artig .......................... | 119/19 |

Primary Examiner—Hugh R. Chamblee
Attorney—Eckhoff and Hoppe

ABSTRACT: A dog blind for supporting and sheltering a retriever in the field proximate to a hunting blind, said dog blind having a sump for collecting drain water and providing a platform for keeping the animal dry.

Patented Oct. 13, 1970
3,533,376
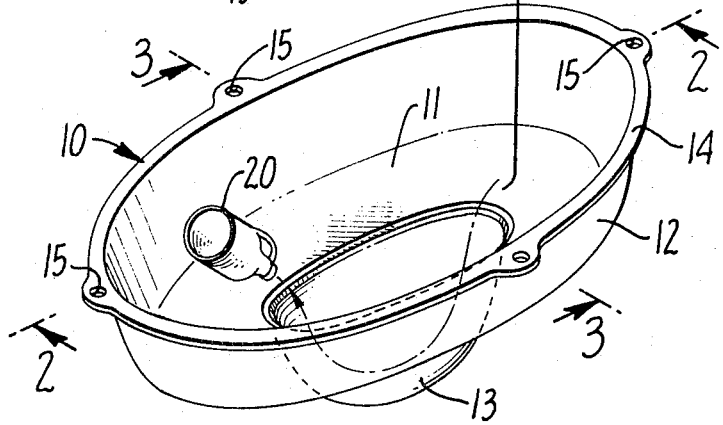
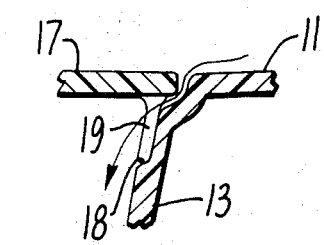
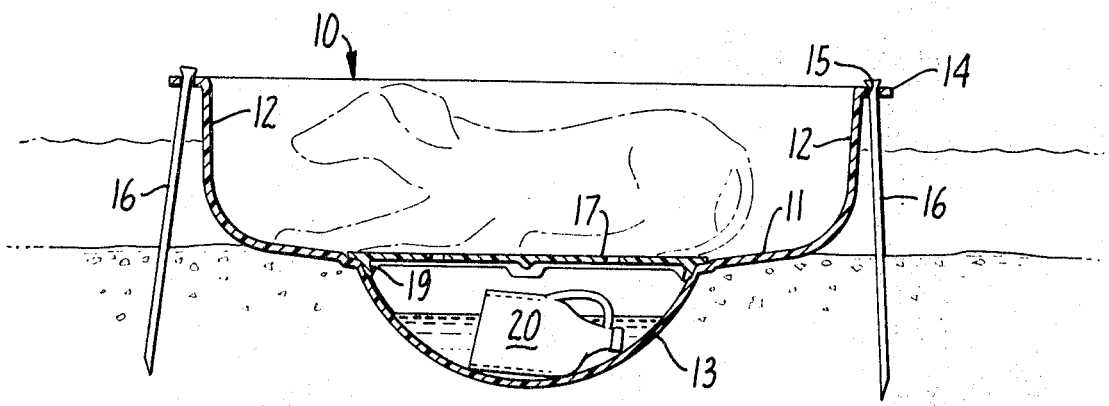
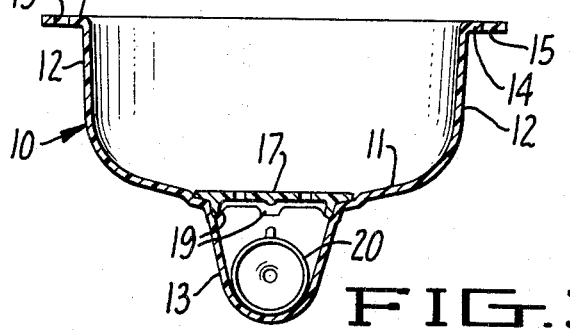
INVENTOR.
HENRY A. SMITH
BY Eckhoff and Hoppe
ATTORNEYS

HUNTING BLIND FOR DOGS

This invention relates generally to hunting blinds and to a platform for concealing and supporting a retriever or hunting dog while waiting to retrieve a kill.

The use of dogs to retrieve game, particularly ducks and geese, is common practice; and yet little has been done to provide a suitable platform for concealing, sheltering and keeping the animal dry between kills. In some instances, the retriever must stand or lie down in the water beside the hunter's blind, although in other instances the dog may be taken into the blind with the hunter. Of course, neither solution is particularly desirable. Forcing a retriever to stand in water beside the hunter's blind is not only hazardous to a dog's health but it may also adversely affect the animal's desire to retrieve. On the other hand, retrievers have the unfortunate habit of shaking water from their coats, which makes it most unpleasant for the hunter who takes his dog into the blind. Even so, most hunting blinds are of insufficient size to accommodate both hunters and retriever.

This invention contemplates providing a special platform and shelter for supporting a retriever or hunting dog in proximate relation to a conventional hunting blind. In particular, the invention contemplates the use of an elongated basket made of water impervious material having a sump integrally formed in the bottom thereof. A cover is utilized for supporting a retriever within the basket above the sump while openings formed in the cover provide fluid communication between the sump and the interior of the basket. The basket as a whole may be imbedded in the ground and/or partially immersed in water.

The invention further contemplates a basket construction formed with an integral peripheral flange having openings formed therein through which "set stakes" may be received to locate or anchor the basket. Another feature contemplated is the use of a scoop which may be housed in the sump and used for removing drain water.

One major object of the invention is to provide a dog blind for supporting and sheltering a retriever beside or in near proximity to conventional hunting blinds.

Another object is to provide an animal blind of the kind described and comprising an elongated basket made of water impervious material and including a sump integrally formed in the bottom thereof.

A still further object of the invention is to provide a dog blind of the kind described that may be kept relatively dry for supporting and sheltering a retriever and yet one which may be manufactured economically.

Other objects of this invention will become apparent in view of the following detailed description and the accompanying drawings.

In the drawings forming a part of this application and in which like parts are identified by like reference numerals throughout the same.

FIG 1 is a perspective view of a preferred embodiment of the invention in a dog blind comprising an elongated basket, a sump cover and scoop for removing water, said cover and scoop being shown in exploded relation to the basket;

FIG 2 is a longitudinal vertical section of the basket with sump cover and scoop in place and illustrating the manner in which water may be collected in the sump while a dog is supported thereabove, said section being taken on lines 2-2 of FIG 1;

FIG 3 is a vertical transverse section of the basket with cover and scoop in place, taken on lines 3-3 of FIG 1; and FIG 4 is a detail and section illustrating the manner in which the sump cover fits within the flooring of the basket.

With reference to the drawings, this invention generally comprises an elongated basket 10 made of water impervious material, such as fiberglass, having an inner floor 11, side wall 12 and an integrally formed sump 13. The upper surface of floor 11 is slightly inclined in a downward direction toward sump 13, said sump being located essentially in the bottom center of the basket. This construction facilitates runoff into the sump. Basket 10 is further provided with an integral peripheral flange 14 located near the upper end of side wall 12. Flange 14 is formed with openings 15 for receiving set stakes 16 that anchor the dog blind in shallow water as illustrated in FIG 2.

A removable sump cover 17 is positionable within the basket above sump 13. Cover 17, it will be noted, is received within the inner floor 11 and is supported upon a ledge 18 defined by a rim that is slightly recessed relative to the floor. Cover 17 is actually supported upon ledge 18 by a plurality of depending flanges 19 mounted on or formed integrally with the cover. The spacing between flanges 19 and floor 11 allow water to drain off into sump 13, in the manner indicated by the flow line of FIG 4. In addition, openings are provided in the sump cover to facilitate direct drainage from the upper surface of the cover into the sump.

It is particularly contemplated that sump 13 should be constructed with sufficient depth for housing a water scoop 20. In particular, a suitable scoop may be made from plastic containers of the type used conventionally for bottling and selling bleach. These containers are formed with handles near a capped end, as illustrated, and the scoop is made quite simply by leaving the cap in place and cutting away the bottom end of the container.

Although a single preferred embodiment of the invention is illustrated and described, various modifications and changes may be made without departing from the spirit of the invention or the scope of the attached claims, and each of such changes or modifications is contemplated.

I claim:

1. A dog blind for supporting and sheltering a retriever, comprising:
   an elongated basket made of water impervious material;
   means defining a sump in the bottom of said basket, said basket and means defining a sump being integrally formed, said basket having an inner floor, said sump having an upper rim formed in the bottom of said basket but slightly recessed relative to the floor and defining a cover-supporting ledge;
   a sump cover for supporting a retriever within said basket above said sump, said sump cover being of a size that allows said cover to be received within the inner floor above said sump and supported a upon said ledge; and
   means providing fluid communication between said sump and the lower interior of said basket to allow fluids to be drained into said sump.

2. A dog blind for supporting and sheltering a retriever, comprising:
   an elongated basket made of water impervious material;
   means defining a sump in the bottom of said basket;
   a sump cover for supporting a retriever within said basket above said sump, said sump cover being formed with a plurality of depending support flanges, said flanges making contact with the bottom of said basket to support said cover therefrom and provide fluid communication peripherally of said cover between the sump and floor; and
   means providing fluid communication between said sump and the lower interior of said basket to allow fluid to be drained into said sump.